United States Patent
Vasudevan et al.

[11] Patent Number: 6,085,093
[45] Date of Patent: Jul. 4, 2000

[54] FREQUENCY TRANSITION PROCESS FOR CAPACITY ENHANCEMENT IN A CELLULAR NETWORK

[75] Inventors: Mini Vasudevan, Arlington; Saleh Faruque, Plano, both of Tex.

[73] Assignee: Nortel Networks Corporation, Richardson, Tex.

[21] Appl. No.: 08/935,285

[22] Filed: Sep. 22, 1997

[51] Int. Cl.[7] .................................................. H04Q 7/20

[52] U.S. Cl. .............................................. 455/447; 455/62

[58] Field of Search .................................... 455/446, 447, 455/448, 450, 62, 63, 422, 449, FOR 106

[56] References Cited

U.S. PATENT DOCUMENTS

| | | | |
|---|---|---|---|
| 5,073,971 | 12/1991 | Schaeffer | 455/63 |
| 5,257,398 | 10/1993 | Schaeffer | 455/63 |
| 5,960,349 | 9/1999 | Chheda et al. | 455/446 |
| 5,960,352 | 9/1999 | Cherpantier | 455/451 |

*Primary Examiner*—Reinhard J. Eisenzopf
*Assistant Examiner*—Charles N. Appiah
*Attorney, Agent, or Firm*—John D. Crane

[57] ABSTRACT

The frequency transition process migrates frequency groups from one frequency reuse plan to another. In response to a change in capacity requirements, the process migrates each layer of the present frequency reuse plan to the layers of the new frequency reuse plan.

2 Claims, 5 Drawing Sheets

| 0° | | | | 120° | | | | 240° | | | |
|---|---|---|---|---|---|---|---|---|---|---|---|
| 1 | 2 | 3 | 4 | 5 | 6 | 7 | 8 | 9 | 10 | 11 | 12 |
| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 |
| 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 |
| 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 |
| 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 |
| 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 |
| 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 |
| 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 |
| 265 | 266 | 267 | 268 | 269 | 270 | 271 | 272 | 273 | 274 | 275 | 276 |
| 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 |
| 301 | 302 | 303 | 304 | 305 | 306 | 307 | 308 | 309 | 310 | 311 | 312 |
| 313 | 314 | 315 | 316 | 317 | 318 | 319 | 320 | 321 | 322 | 323 | 324 |
| 325 | 326 | 327 | 328 | 329 | 330 | 331 | 332 | 333 | | | |

| | 0° | | | | | | 120° | | | | | | 240° | | | | |
|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 |
| 19 | 20 | 21 | 22 | 23 | 24 | 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |
| 235 | 236 | 237 | 238 | 239 | 240 | 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | | | | | | | | | | | | |
| | | | | | | | | | | | | | | | | | |
| 313 | 314 | 315 | 316 | 317 | 318 | 319 | 320 | 321 | 322 | 323 | 324 | 325 | 326 | 327 | 328 | 329 | 330 |
| 331 | 332 | 333 | | | | | | | | | | | | | | | |

N = 4 (25% MIGRATION)

| | 0° | | | | | | 120° | | | | | | 240° | | | | | | |
|---|---|---|---|---|---|---|---|---|---|---|---|---|---|---|---|---|---|---|---|
| 1A | 2A | 3A | 4A | 1B | 2B | 5A | 6A | 7A | 8A | 5B | 6B | 9A | 10A | 11A | 12A | 9B | 10B |
| 241 | 242 | 243 | 244 | 241 | 242 | 245 | 246 | | | 245 | 246 | | | | | | |
| 253 | 254 | 255 | 256 | 253 | 254 | 257 | 258 | 236 | | 257 | 258 | 237 | 238 | 239 | 240 | 237 | 238 |
| 265 | 266 | 267 | 268 | 265 | 266 | 269 | 270 | 247 | 248 | 269 | 270 | 249 | 250 | 251 | 252 | 249 | 250 |
| 277 | 278 | 279 | 280 | 277 | 278 | 281 | 282 | 259 | 260 | 281 | 282 | 261 | 262 | 263 | 264 | 261 | 262 |
| 289 | 290 | 291 | 292 | 289 | 290 | 293 | 294 | 271 | 272 | 293 | 294 | 273 | 274 | 275 | 276 | 273 | 274 |
| 301 | 302 | 303 | 304 | 301 | 302 | 305 | 306 | 283 | 284 | 305 | 306 | 285 | 286 | 287 | 288 | 285 | 286 |
| 313 | 314 | 315 | 316 | 317 | 318 | 319 | 320 | 295 | 296 | 323 | 324 | 297 | 298 | 299 | 300 | 297 | 298 |
| 331 | 332 | 333 | | | | | | 307 | 308 | | | 309 | 310 | 311 | 312 | 309 | 310 |
| | | | | | | | | 321 | 322 | | | 325 | 326 | 327 | 328 | 329 | 330 |

N = 6

| | | 0° | | | | | | | | 120° | | | | | | | 240° | | | |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | | | | | | | | | | | | | | | | | |
| | 2 | 3 | 4 | 5 | 6 | 7 | 8 | 9 | 10 | 11 | 12 | 13 | 14 | 15 | 16 | 17 | 18 |
| 19 | 20 | 21 | 22 | 23 | 24 | 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

FIG. 6A

FREQUENCY TRANSITION PROCESS FOR CAPACITY ENHANCEMENT IN A CELLULAR NETWORK

BACKGROUND OF THE INVENTION

I. Field of the Invention

The present invention relates to radio communications. More particularly, the present invention relates to frequency planning in a cellular network.

II. Description of the Related Art

Cellular radiotelephone systems enable mobile subscribers to communicate with land-line telephone networks while moving through a geographical area. High density, high capacity cells in typical cellular radiotelephone systems are made up of three directional antennas centrally located in a tri-cell group comprising of three cells each 120° from the others. Each antenna radiates into a 120° sector of the tri-cell group. A number of these tri-cellular groups are combined to form the cellular radiotelephone system.

The cell shapes are determined by both the radiation pattern of the antennas and the local conditions at the cell site. Cells, however, are typically idealized as hexagonal patterns since such a pattern closely approximates the ideal antenna radiation pattern.

Cellular radiotelephone systems use different channel frequencies for each mobile subscriber. The transmission from the mobile to the cell uses one frequency while the transmission from the cell to the mobile user uses another frequency. These two frequencies are not used by other nearby mobiles as this would lead to interference on the channel and a reduction in signal quality. This interference is referred to in the art as co-channel interference.

Another type of interference experienced by mobile subscribers is adjacent channel interference. This interference is due to the energy slipover between adjacent channels.

Both types of interference affect the signal quality, referred to as the carrier to interference ratio ($C/I$). This ratio is the signal strength of the received desired carrier to the signal strength of the received interfering carriers. A number of physical factors can also affect $C/I$ in cellular systems including: buildings, geography, antenna radiation patterns, mobile traffic transmitting power, and mobile traffic location within the cell.

Due to the low power of the cell's transmitters, the same frequencies can be reused in other cells, referred to as co-channel cells, in the same geographical area. Greater frequency reuse allows more mobile traffic to use the cellular system. There are, however, constraints on the location of the co-channel cells. Even though the transmitters are typically low power, placing co-channel cells too close may cause interference.

Frequency planning optimizes spectrum usage, enhances channel capacity and reduces interference. A frequency plan also ensures adequate channel isolation to avoid energy slipover between channels, so that adjacent channel interference is reduced. Moreover, an adequate repeat distance is provided to an extent where co-channel interference is acceptable while maintaining a high channel capacity. In order to accomplish these diverse requirements, a compromise is generally made so that the target $C/I$ performance is acquired without jeopardizing the system capacity.

FIG. 1 illustrates a typical prior art N=4, 120° tri-cell group. This system is based on dividing the available channels into 12 frequency groups that are distributed evenly among four 120° tri-cell groups (a cluster) comprising of 12 cells. One frequency group is allocated per cell.

The cluster of FIG. 1 is used to construct a cellular network. Each cluster is repeated throughout the network. As a result, there are multiple co-channel sites that are oriented in the same direction. The C/I performance, therefore, is due to those co-channel interferers.

In the above example, the co-channel interferers would normally cause problems for quality communications in this system. In this case, antenna downtilt and beam width, have to be properly engineered for satisfactory performance and operation of this system.

To meet subscriber growth requirements, modifications to existing frequency plans and adoption of different cluster schemes are required. For example, one system may have to be transformed from an N=8 system to an N=4 system.

When the new frequency plans have to be deployed in existing cellular networks, the changes have to be done in phases, taking into account the additional capacity requirements. Additionally, the transition has to take place smoothly and coexist with the existing scheme with minimum disturbance to the cellular network and subscribers. There is a previously unknown need for a method for transitioning from one frequency plan to another frequency plan without disrupting the cellular network.

SUMMARY OF THE INVENTION

The present invention encompasses a process for transitioning from one frequency reuse plan to another frequency reuse plan in a cellular radiotelephone system. In the preferred embodiment, the cellular radiotelephone system is comprised of a number of tri-cellular groups. Each group has directional antennas in the center, each antenna radiating a different cell of the group. The group has three frequency reuse directions.

The process of the present invention converts the frequency groups of the old frequency reuse plan to the frequency groups of the new frequency reuse plan in response to a change in capacity. The conversion is done based on reuse direction.

BRIEF DESCRIPTION OF THE DRAWINGS

FIG. 3 shows a table of frequency groups for the N=4 directional frequency reuse plan of FIG. 1.

FIG. 4 shows a table of frequency groups for the N=6 directional frequency reuse plan of FIG. 2.

FIG. 6 shows a table of frequency groups for the transition from the N=6 system to the N=4 system with 25% migration completed.

DETAILED DESCRIPTION OF THE PREFERRED EMBODIMENT

The transition process of the present invention migrates from one frequency plan to another frequency plan without disrupting the cellular network. The process transitions the network from a lower capacity frequency plan to a higher capacity frequency plan or vice versa. The migration is performed based on capacity requirements.

The transition process borrows a fixed set of channels from the existing frequency plan according to the growth requirement and reallocates the borrowed channels into the new plan. The borrowed channels are repeated in the new plan according to the new cluster reuse scheme.

The percentage of channels borrowed is increased in steps as the growth demands. For example, 25% of the channels may be migrated over initially, with additional 25% blocks of frequency groups migrated later as the subscribers and/or subscriber use increases in the network. Alternate embodiments migrate different percentages of channels.

The transition process is flexible in its ability to adapt to any growth plan. The process migrates frequency groups from one frequency plan to another at different rates. The process works in networks that have fractional multiples of cluster reuse patterns. For example, migration from N=6 to N=4, where 6 is not an integral multiple of 4.

To illustrate the transition process of the present invention, a transition from N=6 to N=4 is used as an example. Such a transition would occur when greater capacity is required from a system since the N=4 system is a higher capacity system. As stated above, however, alternate embodiments use other frequency reuse transitions.

Figure 1:
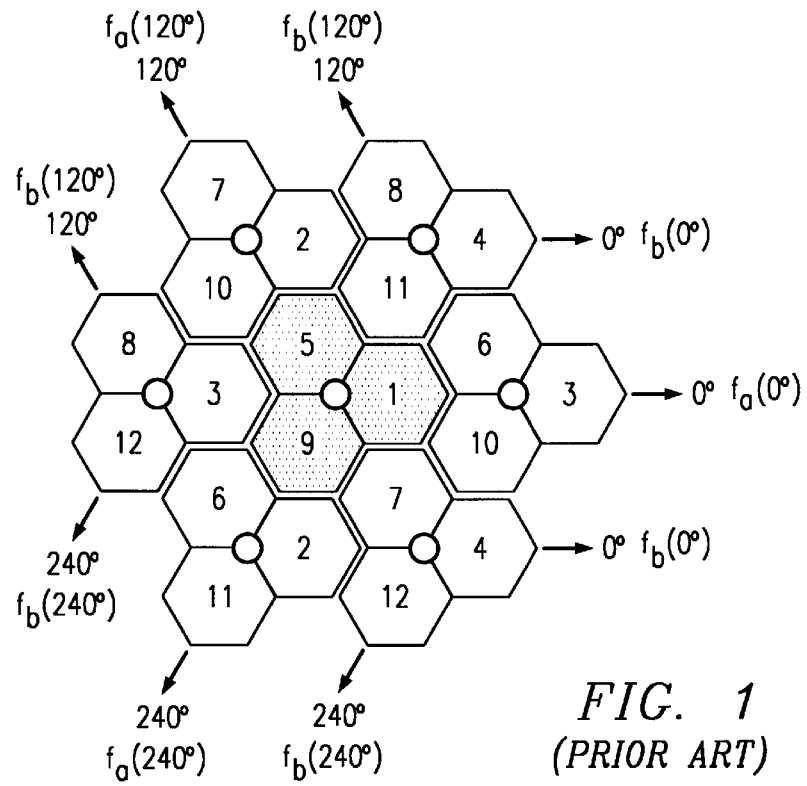
FIG. 1 shows a tri-cellular frequency plan utilizing a typical prior art N=4 directional frequency reuse plan.
Figure 2:
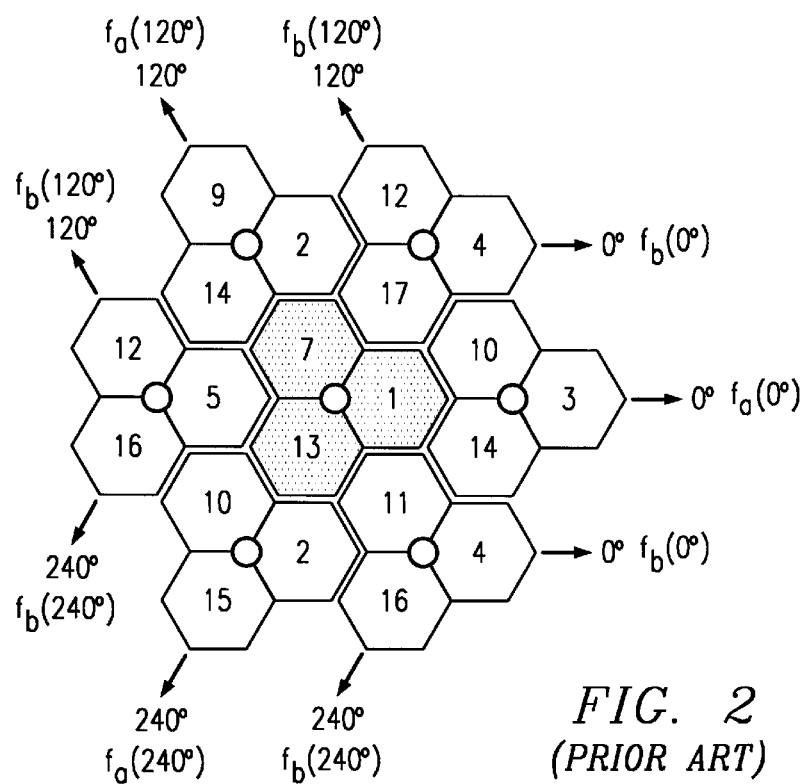
FIG. 2 shows a tri-cellular frequency plan utilizing a typical prior art N=6 directional frequency reuse plan.

FIG. 2 illustrates an N=6 frequency reuse tri-cellular cluster while FIG. 1 illustrates an N=4 tri-cellular cluster. The table illustrated in FIG. 3 is the frequency plan for the N=4 system. FIG. 4 illustrates the table for the frequency plan for the N=6 system.

As is well known in the art, the numbers in the cells of FIGS. 1 and 2 indicate the frequency group assigned to that particular cell. These frequency group numbers are also illustrated at the top of the columns in the tables of FIGS. 3 and 4 respectively. The frequencies assigned to each frequency group is in the column under the frequency group number. Frequencies 313 to 333 are the control channels that are well known in the art.

The frequency reuse axes in FIGS. 1 and 2 are comprised of layers. These layers are indicated by the designations $f_a(0°)$ and $f_b(0°)$. As can be seen in FIGS. 1 and 2, layer $f_b(0°)$ is repeated on either side of layer $f_a(0°)$. This layering scheme is repeated for the remaining two frequency reuse axes.

Figures 5, 6B:
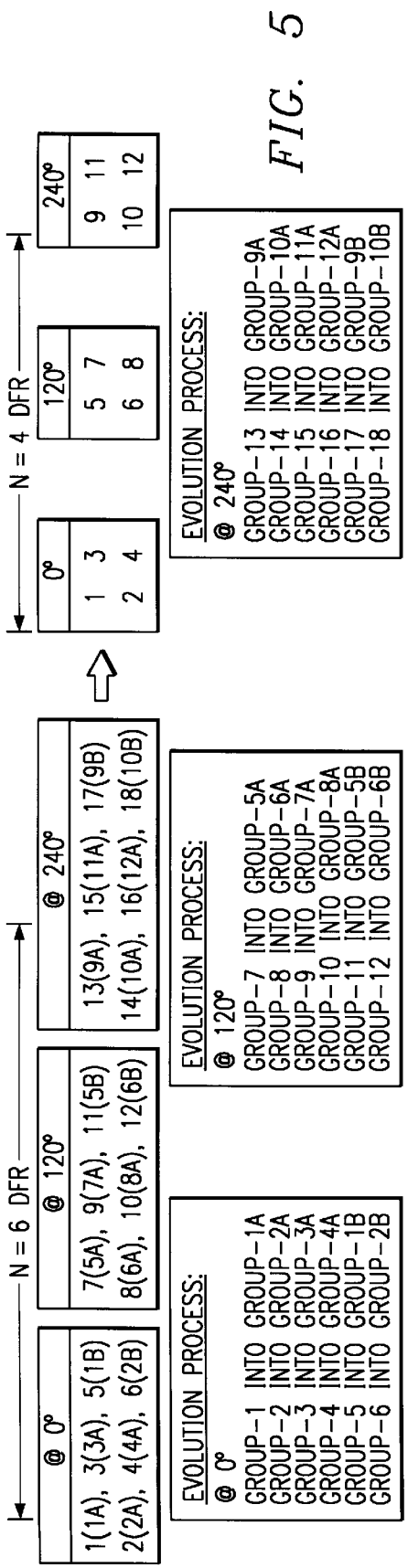
FIG. 5 shows a table of the frequency groups during a migration from one frequency plan to another.

FIGS. 5 and 6 illustrate the frequency transition process of the present invention. A certain percentage of the 18 frequency groups of the N=6 system are chosen to be regrouped as 12 frequency groups of the N=4 layout. The percentage of frequency groups chosen is based on the desired capacity increase.

In the example illustrated in the tables of FIG. 6, 25% of the N=6 frequencies are to be regrouped as N=4 frequency groups. This means frequencies 235–312 of FIG. 4 are going to be migrated from the N=6 system to the N=4 system. This partial migration process is illustrated in FIG. 5.

The process starts by migrating the frequency groups in the first reuse direction, along the 0° axis, from the N=6 frequency plan to the N=4 frequency plan. As seen in FIG. 5, 25% of the frequencies in frequency groups 1–4 are migrated to new frequency groups 1A–4A respectively.

Since a portion of the N=6 system remains, the old groups 5 and 6 must be reassigned until the N=6 frequency plan is converted entirely to the N=4 system. Therefore, part of the frequency groups 5 and 6 are migrated into groups 1B and 2B. As seen in the lower table of FIG. 6, these are repetitions of groups 1A and 2A. After the entire system has been regrouped as an N=4 system (100% migration), the B groups are then identical to the A groups and are no longer needed, resulting in 12 frequency groups of the N=4 frequency reuse plan.

The process next migrates the frequency groups of the 120° frequency reuse direction. In this example, part of the frequencies in frequency groups 7–10 are migrated to frequency groups 5A–8A. Part of old frequency groups 11 and 12 are migrated to groups 5B and 6B respectively as explained above for the 0° direction.

Finally, the process migrates the frequency groups of the 240° reuse direction to the new frequency groups. Part of the frequencies in the frequency groups 13–16 are migrated to frequency groups 9A–12A while part of the frequencies in groups 17 and 18 are migrated to 9B and 10B respectively as explained above for the 0° direction.

In the above example, the process started with the 0° reuse direction. Alternate embodiments start with other reuse directions and continue with the other reuse directions in no certain order. Additional embodiments perform the entire conversion of the frequency groups from one plan to the other simultaneously.

While the above example illustrates the process of transforming an N=6 frequency reuse plan to an N=4 frequency reuse plan, alternate embodiments of the process migrate from a higher capacity reuse plan to a lower capacity reuse plan. For example, the process could transform an N=4 system to an N=6 system for any percentage of the total number of frequencies.

The upper table of FIG. 6 shows that frequencies 1–234 remain in the N=6 configuration. The lower table shows the frequency assignment for the migrated frequencies after 25% migration is complete. Frequencies 235–312 have been reassigned to the N=4 frequency reuse plan, now operating in conjunction with the N=6 frequency reuse plan. Under 25% partial migration, groups 1–4 of the old plan will co-exist with groups 1A–4A respectively of the new plan. Groups 5 and 6 of the old plan will co-exist with groups 1B and 2B respectively of the new plan. Groups 7–10 of the old plan will co-exist with groups 5A–8A respectively of the new plan. Groups 11 and 12 of the old plan will co-exist with groups 5B and 6B respectively of the new plan. Groups 13–16 of the old plan will co-exist with groups 9A–12A respectively of the new plan. Groups 17 and 18 of the old plan will co-exist with groups 9B and 10B respectively of the new plan. Frequency groups 313–333 are still control channels.

In summary, the frequency transition process of the present invention smoothly transitions from one frequency reuse plan to another frequency reuse plan. This transition can be a complete migration of all the frequencies or any other percentage less than 100% depending on the capacity needed by the cellular network.

We claim:

1. A method for transitioning a percentage of frequencies from an N=6 frequency reuse plan to an N=4 frequency reuse plan in a cellular radiotelephone system having a first, a second, and a third frequency reuse direction, each frequency reuse direction assigned frequency groups that are different from the frequency groups assigned to the remaining reuse directions, the method comprising the steps of:

transforming the percentage of frequencies from frequency groups 1–4 of the N=6 plan, in the first reuse direction, to frequency groups 1–4 respectively of the new plan;

transforming the percentage of frequencies from frequency groups 5 and 6 of the N=6 frequency reuse plan, in the first reuse direction, to the first repetition of frequency groups 1 and 2 respectively of the new plan;

transforming the percentage of frequencies from frequency groups 7–10 of the N=6 frequency reuse plan, in the second reuse direction, to frequency groups 5–8 respectively of the new plan;

transforming the percentage of frequencies from frequency groups 11 and 12 of the N=6 frequency reuse plan, in the second reuse direction, to the first repetition of frequency groups 5 and 6 respectively of the new plan;

transforming the percentage of frequencies from frequency groups 13–16 of the N=6 frequency reuse plan, in the third reuse direction, to frequency groups 9–12 respectively of the new plan; and transforming the percentage of frequencies from frequency groups 17 and 18 of the N=6 frequency reuse plan, in the third reuse direction, to the first repetition of frequency groups 9 and 10 respectively of the new plan.

2. A method for transitioning a percentage of frequencies from an N=4 frequency reuse plan to an N=6 frequency reuse plan in a cellular radiotelephone system having a first, a second, and a third frequency reuse direction, each frequency reuse direction assigned frequency groups that are different from the frequency groups assigned to the remaining reuse directions, the method comprising the steps of:

transforming the percentage of frequencies from frequency groups 1–4 of the N=4 frequency reuse plan, in the first reuse direction, to frequency groups 1–4 respectively of the new plan;

transforming the percentage of frequencies from a first repetition of frequency groups 1 and 2 of the N=4 frequency reuse plan, in the first reuse direction, to frequency groups 5 and 6 respectively of the new plan;

transforming the percentage of frequencies from frequency groups 5–8 of the N=4 frequency reuse plan, in the second reuse direction, to frequency groups 7–10 respectively of the new plan;

transforming the percentage of frequencies from a first repetition of frequency groups 5 and 6 of the N=4 frequency reuse plan, in the second reuse direction, to frequency groups 11 and 12 respectively of the new plan;

transforming the percentage of frequencies from frequency groups 9–12 of the N=4 frequency reuse plan, in the third reuse direction, to frequency groups 13–16 respectively of the new plan; and transforming the percentage of frequencies from a first repetition of frequency groups 9 and 10 of the N=4 frequency reuse plan, in the third reuse direction, to frequency groups 17 and 18 respectively of the new plan.

\* \* \* \* \*